Figure 1:
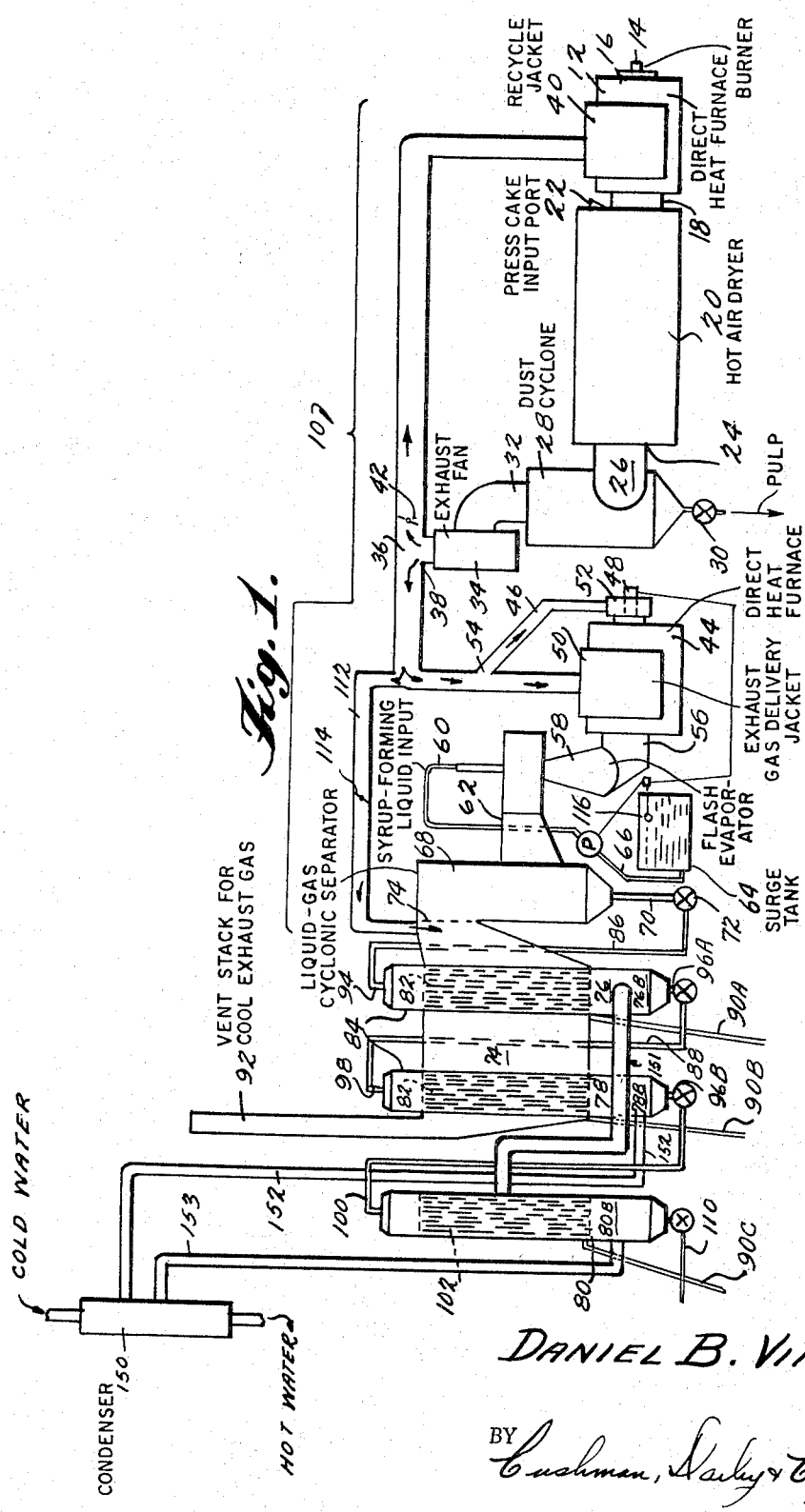

Oct. 31, 1967  D. B. VINCENT  3,349,827
WASTE HEAT RECOVERY SYSTEMS FOR DEHYDRATING PULPY
SOLIDS AND SYRUP FORMING LIQUID
Filed Jan. 24, 1966  2 Sheets-Sheet 2

Fig. 2.

INVENTOR
DANIEL B. VINCENT
BY Cushman, Darby & Cushman
ATTORNEYS

United States Patent Office 3,349,827
Patented Oct. 31, 1967

3,349,827
WASTE HEAT RECOVERY SYSTEMS FOR DE-
HYDRATING PULPY SOLIDS AND SYRUP
FORMING LIQUID
Daniel B. Vincent, 3015 3rd Ave.,
Tampa, Fla. 33605
Filed Jan. 24, 1966, Ser. No. 522,734
10 Claims. (Cl. 159—4)

The present invention relates to drying and evaporating wet material and more particularly to apparatus and a method for recovering heat energy supplied to such systems and utilizing the recovered heat energy to effect a further evaporation.

While the heat recovery system of the present invention is applicable to the production of many products, for instance, drying fish meal and concentrating fish solubles, the production of it will be described in this specification fully in relation to processing citrus cannery waste to produce cattle feed. In referring to the weight of moisture to be evaporated by any particular piece of apparatus, the terms "dryer load" and "evaporator load" will be used.

In many processes involving the removal of moisture by evaporation from a wet solid material, a pressing operation is used to divide the inbound product into a solids phase and a liquid phase.

The solids phase is then dried in a hot air dryer, for instance, a direct heat rotary dryer in which a current of hot dry air is passed through a curtain of the damp pressed material to evaporate and carry off moisture through conversion of sensible heat in the air to latent heat of vaporization of moisture from the solids.

If the system is such that a rapid flow of air through the dryer is necessary to move the material being dried along through the dryer by force of the current of air, or if a high dry bulb exhaust temperature is necessary to result in a properly dried final product, the dew point temperature of the exhaust gases can be considerably lower than the dry bulb temperature.

Should it be desirable to elevate the dewpoint, this can be accomplished by recycling part of the exhaust gases back through the hot air furnace and adding the required heat units necessary for the desired evaporation. However, such a process is limited to oxygen requirements for combustion of the fuel being used.

The liquid phase from the presses is concentrated either in multiple effect tube-bundle evaporators or in a direct contact flash evaporator such as those described in my earlier U.S. Patent No. 2,818,917.

In a flash evaporator, it is easy to operate at or within a few degrees dry bulb temperature to the dew point temperature of the gases because very little temperature elevation is necessary between the drying gases and the liquor being concentrated.

In the dryer on the other hand, a considerable difference between dry bulb and dew point temperature is necessary in the exhaust gases to properly dry the solid particles or the particles will pass from the dryer containing too much moisture, particularly in the center part of each particle.

In an all-inclusive pressing-drying system, varying conditions of the inbound material at times results in more water to be evaporated from the press liquor than can be effected using the energy contained in the dryer exhaust gases.

It is a primary object of the present invention to provide a new drying and evaporating system of low heat requirements by using a combination of direct heat drying, flash evaporation, and secondary heat exchange to utilize and capture for further evaporation practically all of the energy supplied to the system and to send to wasteful exhaust very little energy as compared to prior art systems.

More specifically, the present invention has as object using the moisture laden exhaust gases from a flash evaporator as a source of energy to further concentrate liquors that have passed through the flash evaporator by drawing a vacuum within an evaporator tube bundle in which the liquors are boiling to provide a lower boiling point temperature than the dew point temperature in the exhaust gases from the flash evaporator passing over the tubes; and to raise the dewpoint temperature in the exhaust gases by recycling these gases through the furnace from the dryer for recovery of energy from the exhaust gases, both systems acting in concert to produce economies over prior art processes.

These and further objects of the present invention as well as the principles and scope of applicability of the invention will become more clearly apparent during the following detailed discussion in which specific examples and preferred embodiments of the invention are discussed in connection with the attached drawings.

In the drawings:

FIGURE 1 is a diagrammatic flow sheet showing apparatus for practicing the invention according to a first embodiment; and FIGURE 2 is a diagrammatic flow sheet similar to FIGURE 1 of a modification.

Citrus cannery waste amounts to about 50 percent by weight of the citrus fruit being processed and is a source of considerable income to the canner. Typically, canneries process oranges, grapefruit, tangerines, limes and lemons which they obtain from groves in many localities, sometimes hauling the fruit in trucks for 100 miles or more when fruit growing near their plant is priced too high. The quality of citrus cannery waste and its moisture content varies over a broad range depending on the kind of fruit being processed, the condition of the fruit and the area from which the fruit is obtained.

When a basic concentrated juice or single strength juice is being produced from fresh citrus fruit the waste may range in moisture content from 77 to 81 percent while the waste from the line packing fruit sections may be 85 percent or higher moisture content. Also, the press liquors from this waste may vary from 8 percent solids to 13 percent solids. All of the waste from the above processes is often conveyed to a single surge bin to be processed by the animal feed mill machinery and all of these moisture solids variations may occur off and on throughout the day.

In making animal feed citrus canery waste consisting of the peel, rag, seed and cull fruit is shredded, lime treated and pressed for instance as outlined in my earlier U.S. Patent No. 2,536,240. Damp solids from the press, known as press cake, are dried in a three pass rotary dryer. The press liquors are concentrated in an evaporator to produce citrus molasses which can be sold as such or can be added back to the press cake and dried when the market price of molasses solids enriched dried feed is higher than that for molasses alone.

The following examples relating to producing dried animal feed with and without incorporating citrus molasses solids will provide a basis for discussing the drying problems to which the present invention is addressed. All measurements are in pounds unless otherwise specified.

Example 1

100 pounds of orange waste containing 23 pounds of solids and 77 pounds of moisture were pressed with 10 pounds steam having been added in the press to obtain a press cake and press liquor.

| | | |
|---|---|---|
| Press cake | 68.2 | 20.5 |
| Containing 30 percent solids | | |
| The press cake was dried to produce animal feed containing 10 percent mositure | −22.8 | |
| Drier load | 45.4 | |
| Press liquor | 31.8 | 2.5 |
| Containing 8 percent solids | | |
| Steam condensed into liquor | +10.0 | |
| Total | 41.8 | |
| Amount of 72 Brix citrus molasses produceable by evaporation of moisture: (2.5) (.72) equals | −3.5 | |
| Evaporator load | 38.3 | |

Example 2

100 pounds of orange waste containing 23 pounds of solids and 77 pounds of moisture were pressed with 10 pounds of steam having been added in the press in order to eliminate additional moisture from the press cake and thereby increase its solids content as a percentage. A press cake and a press liquor were obtained.

| | | |
|---|---|---|
| Press cake | 68.2 | 20.5 |
| Containing 30 percent solids | | |
| Press liquor (including condensed steam) | 41.8 | 2.5 |
| Containing 8 percent solids | | |

To the press cake were added 7 pounds of 72 Brix citrus molasses, the press cake and molasses were intimately mixed to provide a mixture weighing 75.2 pounds. The mixture was pressed to obtain a second press cake and a second press liquor.

| | | |
|---|---|---|
| Second press cake | 55.9 | 23.0 |
| Containing solids | | |
| Dried feed containing 10 percent moisture | −25.6 | |
| Dryer load | 30.3 | |
| Second press liquor | 19.3 | 2.54 |
| Containing solids | | |

The first and second press liquors were mixed together and fed to an evaporator for concentration to 72 Brix syrup.

| | | |
|---|---|---|
| Total press liquor | 61.1 | 5.04 |
| Containing solids | | |
| Amount of 72 Brix citrus molasses produceable by evaporation of moisture (5.04) (.72) equals | −7.0 | |
| Evaporator load | 54.1 | |

The 7 pounds of 72 Brix citrus molasses were saved for additional to the first press cake of the next batch of orange waste as above.

Example 3

100 pounds of grapefruit waste containing 15 pounds of solids and 85 pounds of moisture were pressed (without using steam) to obtain a press cake and press liquor.

| | | |
|---|---|---|
| Press cake | 25 | 7.5 |
| Containing 30 percent solids | | |
| The press cake was dried to produce animal feed containing 10 percent moisture | −8.4 | |
| Dryer load | 16.6 | |
| Press liquor | 75 | 7.5 |
| Containing 10 percent solids | | |
| The press liquor was condensed in an evaporator to produce 72 Brix citrus molasses: (7.5) (.72) equals | −10.5 | |
| Evaporator load | 64.5 | |

Example 4

100 pounds of a grapefruit waste containing 15 pounds of solids and 85 pounds of moisture were pressed (without steam) to obtain a press cake and press liquor.

| | | |
|---|---|---|
| Press cake | 25 | 7.5 |
| Containing 30 percent solids | | |
| Press liquor | 75 | 7.5 |
| Containing 10 percent solids | | |

To the press cake were added 13 pounds of 72 Brix citrus molasses containing 9.36 pounds of solids. The press cake and molasses were intimately mixed to provide a mixture weighing 38 pounds of which 16.86 pounds were solids. The mixture was pressed to obtain a second press cake and a second press liquor.

| | | |
|---|---|---|
| Second press cake | 32.66 | 15.0 |
| Containing solids | | |
| Dried feed containing 10 percent moisture | −16.65 | |
| Dryer load | 16.01 | |
| Second press liquor | 5.34 | 1.86 |
| Containing solids | | |

The first and second press liquors were mixed together and fed to an evaporator for concentration to 72 Brix syrup.

| | | |
|---|---|---|
| Total press liquor | 80.34 | 9.36 |
| Containing solids | | |
| Amount of 72 Brix citrus molasses produceable by evaporation of moisture (9.36) (.72) | −13.00 | |
| Evaporator load | 67.34 | |

The 13 pounds of 72 Brix citrus molasses were saved for addition to the first press cake of the next batch of grapefruit waste as above.

TABLE 1

| Results | Dryer Load | Evaporator Load | Ratio Dryer Load to Evaporator Load |
|---|---|---|---|
| Example 1 | 45.4 | 38.3 | 1:0.85 |
| Example 2 | 30.3 | 54.1 | 1:1.79 |
| Example 3 | 16.6 | 64.5 | 1:3.88 |
| Example 4 | 16.01 | 67.34 | 1:4.2 |

Citrus waste press cake is usually dried in a three pass rotary dryer and was in the examples above. This consists of a furnace, a steel drum revolving around a horizontal axis, a cyclone type air solids separator and an exhaust fan. Forward movement of the press cake through the three passes depends entirely on the conveying influence of the air current. Drying of this pulp depends upon; temperature of the inbound air current, length of time the pulp is in the machine and temperature of the exhaust gases leaving the dryer. These conditions are directly related to dryer design.

TABLE 2

| | Dryer A | Dryer B |
|---|---|---|
| Dryer Load Per Min. (observed), pounds | 266 | 266 |
| Exhaust Temperature (observed), degrees | 340 | 235 |
| Web Bulb Temperature (observed), degrees | 158 | 158 |
| Humidity, pounds water vapor per pound dry air (tables) | .2165 | .2515 |
| Dewpoint temperature (tables), degrees | 150.62 | 155 |
| Inbound dry air required (tables), pounds | 1,230 | 1057 |
| Heat Energy exhausted to atmosphere (tables), B.t.u. | 424,000 | 364,000 |
| Heat Energy in Exhaust per pound dry air, B.t.u. | 344.46 | 344.46 |
| Air required for combustion with 50 percent excess, pounds | 508 | 435 |

Dryer A was a commercially available three pass rotary dryer. Dryer B was constructed according to the principles set forth in my earlier U.S. Patent No. 2,705,842.

It should be clear that heat recovery systems according to the present invention will have to be matched to the dryer being utilized, but any modifications necessary will be apparent to those skilled in the art after reading the following explanation of the process in relation to dryer B.

It will be noted from Table 2 that in normal operation it takes 1057 pounds of heated dry air to move the pulp through the dryer and an exhaust temperature of 235 degrees to dry the pulp to 10 percent moisture. This requires 364,000 B.t.u. if the inbound pulp and air are at 32 degrees F. and there is no heat loss. This basis will be used in the following explanations in order to permit use of adiabatic tables for comparison. Actual operations require about 10 percent additional heat energy to cover heat losses, or may be lower if the temperature of the inbound material and air are higher.

The present discussion does not attempt a rigorous solution of all heat and mass transfer aspects of the drying system since such is considered unnecessary to import an understanding of the principles and best methods of carrying out the present invention. For instance, neglected are: water vapor content of incoming air, friction losses, mass increase in the dryer outlet gas stream due to combustion of fuel to carbon dioxide and water vapor, and error resulting from using adiabatic chart for air on the exhaust gas which actually comprises air partly depleted of oxygen and increased in water vapor and carbon dioxide plus some citrus waste volatiles such as vaporized peel oil essences. These factors which tend to increase heat and air required compared with discussions neglecting these factors have been taken care of in the present case in the empirically arrived at B.t.u. and air requirements.

To properly and completely burn heavy fuel oil, about 1.2 pounds of air per 1000 B.t.u. of heat energy is required. In the above case this will be 435 pounds per minute. It will be observed from Table 2 that in normal operation dryer B exhausts 364,000 B.t.u. per minute at a dewpoint temperature of 155 degrees. By sending back to the furnace, a part of the moisture laden exhaust gases, sufficient energy to move the pulp through the dryer can be maintained and only sufficient air inducted into the system each minute to satisfy the oxygen requirements for complete combustion of the fuel being burned. Similarly, only sufficient gas need be exhausted from the system to maintain a steady state condition with respect to temperature weight, oxygen percentage and humidity within the system.

Using the Dryer B example once more, steady state conditions can be maintained if 435 pounds of exhaust gas (dry basis) containing 266 pounds of water vapor is withdrawn from the dryer system per minute and the remainder of the exhaust gas recycled to the dryer. Obviously, this can be achieved only when the average constituency of the exhaust gas at the dryer outlet is 266 pounds of water vapor per 435 pounds of exhaust gas (dry basis) i.e., 612 pounds water vapor per pound of exhaust gas. For the Dryer B exhaust temperature this occurs with a dewpoint temperature of 178.4 degrees F. with 695 pounds per minute of exhaust gases being recycled.

In order to evaporate moisture from the press liquors, the moisture-laden gases withdrawn from the dryer system is passed around the tubes of an evaporator in which a vacuum is being drawn. Moisture will condense on the outside of the tubes when temperature of the gases falls below the dewpoint of the gases and evaporation of the moisture from liquors within the tubes will occur.

For practical machinery investment this dewpoint should not fall below 158 degrees F. and a boiling temperature of 140 degrees F. inside the tubes. This will result in about 133 pounds of evaporation in the first stage of the evaporator. A second and third effect, using the evaporated vapor as energy in each case, can be added if cold condenser waters are available and fuel costs are sufficiently high to warrant the investment. Under these conditions, a second stage can also be added in which the exhaust gas dewpoint is reduced to 138 degrees F. and the evaporator boiling point to 98 degrees. With all of the above, results will be about as follows:

Table 3

| Evaporation: | Lbs./min. |
|---|---|
| 1st Stage | 133 |
| 2nd Effect | 110 |
| 3rd Effect | 100 |
| 2nd Stage | 67 |
| Total maximum evaporation in recovery system | 410 |
| Evaporation in Dryer B | 266 |

Ratio: Dryer load/Evaporator load 1:1.54.

From Table 3, it should be appreciated that if the dryer load/evaporator load ratio were lower than 1:1.54 for any drying liquor concentration problem further energy would have to be added to the liquor concentration system because not enough energy could be recovered from the exhaust gases of the pulp drying system.

Having reference to Examples 1–4 and specifically to Table I it is apparent that only in Example 1 could the press liquor possibly be concentrated to 72 Brix using solely energy recovered from the dryer exhaust gases input ot the evaporator, and then only if the evaporator were highly efficient.

In order to provide sufficient additional thermal energy to attain 72 Brix concentration of press liquor in dryer-evaporator systems with maximum recycle and thermal energy recovery as described yet provide for fluctuation both in the long term, depending on the type of cannery waste being processed, and in the short term, depending on variation in the moisture content throughout particular lots of any one kind of cannery waste, it is proposed according to the present invention to integrate a flash evaporator into the so far described system between the dryer and evaporator.

A preferred embodiment of such a dryer-evaporator system is shown in FIGURE 1 and generally indicated at 10. The equipment shown includes a hot air furnace 12 having a burner 14 and an air intake 16. A conventional blower not shown in detail is used to force air in through the intake 16.

The heated air exits from the furnace 12 through the conduit 18 to the hot air dryer 20 where it contacts, carries along and drys the press cage which is received into the dryer through the port 22 which may constitute the lower end of a metering hopper (not shown). The press cake typically has been shredded, ground, and lime treated and has 70-75 percent moisture content by weight. The dryer 20 at its outlet 24 communicates with a conduit 26 that feeds the dried press cake and hot exhaust gases to the dust cyclone 28 where the dried product is separated from the exhaust gases. The product, typically particulate citrus pulp having 10 percent moisture content by weight is withdrawn from the cyclone through the discharge valve 30 and the exhaust gases are withdrawn from the cyclone through the conduit 32 with the aid of exhaust fan 34. The fan 34 communicates with an exhaust gas duct 36 via a T 38. Rightwardly of the T 38 the duct 36 returns to the hot air furnace 12 and communicates with the interior of the furnace downstream from the burner via the recycle jacket 40. A butterfly valve or the like at 42 allows control over the proportion of exhaust gases which are returned to the furnace versus the proportion which is withdrawn from the dryer system via the duct 36 leftwardly of the T 38. The latter portion is directed to a hot air furnace 44. As seen in FIGURE 1, the exhaust gas duct branches before reaching the furnace 44 providing a duct 46 that communicates with a fuel burner 48 to supply combustion air to the burner. The main left branch of the exhaust gas duct 36 terminates in a jacket 50 through which the exhaust gases are delivered to the furnace 44. The furnace 44 includes a booster fan 52 for supplying additional combustion air to the furnace 44 burner 48 when the exhaust gases entering through the duct 46 do not contain sufficient oxygen to satisfy the burner requirements. A butterfly valve 54 is interposed in the duct 46 to allow regulation of the percentage of exhaust gases directed to the burner 48.

The hot exhaust gases exit from the furnace 44 through the duct 56 which conducts the hot gases to the bottom of a flash evaporator 58 for initiating concentration of the press liquors (Examples 1–4). A preferred flash evaporator especially suited to use in the system 10 is shown and more completely described in my earlier United States Patent No. 2,818,917 whose teaching is now incorporated by reference. Briefly, the flash evaporator 58 includes a liquor inlet 60 at the top which in the present instance is coaxial with a shaft having an impeller (not shown) mounted thereon within the evaporator. The flash evaporator has at least one outlet duct 62.

Press liquors are delivered from the pressing operation to an inbound liquor surge tank 64 which has an outlet line 66 which communicates with the liquor inlet 60 of the flash evaporator. Upon entering the flash evaporator the liquor is sprayed downwardly contacts the hot exhaust gas which is blowing upwardly through the duct 56. The confrontation of the liquor and hot exhaust gas causes turbulence, enhanced by the above-mentioned impeller and a highly efficient heat exchange takes place resulting in a large portion of the more volatile constituents of the liquor, mainly water, being vaporized as heat flows from the exhaust gas to the liquor droplets. The now cooler and wetter hot exhaust gas together with the now more condensed liquor droplets are swept from the flash evaporator through the outlet duct 62 by the onrush of incoming hot exhaust gas.

The outlet duct 62 leads the exhaust gas-liquor droplet mixture to a liquid-gas cyclonic separator 68 where the two are separated. The liquor exits from the bottom of the separator 68 through a discharge conduit 70 and discharge valve 72. The exhaust gas exits from the top of the separator 68 through a duct 74.

As seen at the left in FIGURE 1, further evaporation of volatiles, mainly water, from the liquor is accomplished in a plurality of vacuum pans 76, 78 and a multieffect evaporator 80. As shown, each of the vacuum pans 76, 78 has tube bundles 82 and a jacket 84. The exhaust gas duct 74 communicates successively with the interiors of the jackets 84 so that the hot gas flows around the tube bundles 82. The liquor proceeding through lines 86 and 88 passes successively through the tubes of the vacuum pans 76 ad 78.

Condensation of liquid from the exhaust gases occurs on the outside of the tubes as heat is given up by the gases to evaporate further volatiles, mainly water from the liquor within the tubes. The condensate is withdrawn from the jackets via the lines 90-A and 90-B and the cooled exhaust gas is finally vented to the atmosphere through the stack 92. Vacuum is drawn on the tube bundles 78 and 80 via conventional pumping means shown as barometric condensor 150. Proceeding from the pump 72 the liquor flows through conduit 94 to the top of the tubes of the evaporator 76 down through its tubes into the conduit 96A, then through the conduit 98 to the top of the tubes of the evaporator 78, down through its tubes and through the conduit 100 to the top of the tubes 102 of the secondary vacuum pan 80. The concentrated liquor is recovered at the outlet 110, typically as 72 Brix citrus molasses.

Vacuum pans 76, 78 and 80 as here illustrated are the falling film type in which both the liquor being evaporated and the evaporated vapor pass downward inside the tubes, (the liquor being a film on the inside wall of the tubes), into an expansion chamber 76B, 78B and 80B respectively.

In these chambers the liquid is separated from the hot vapor and passes out through pipes 96A and 96B and 110. The hot vapors from vacuum pan 76 are passed through duct 151 to the space between the jacket and tubes of tube bundle 80 to become the source of heat for further evaporation of water from the liquids inside these tubes. The vapors condense on the outside wall of the tubes and contact thereby sucking from pan 76 the vapors being produced therein and thus creating the vacuum in pan 76.

Vapors from pan 78 and 80 are conducted to condensor 150 through ducts 152 and 153 respectively.

Condensate from outside the tube bundles 76, 78 and 80 is withdrawn through pipes 90A, 90B and 90C respectively.

The terms "tank" and "surge" tank as used herein should be understood as broadly including any vessel or conduit means such as pipelines.

Further details of the apparatus shown in FIGURE 1, include the provision of a flash evaporator by-pass duct 112 in the exhaust gases system, communicating at one end with left branch of the duct 36 upstream from the hot air furnace 44 and communicating at its opposite end with the hot exhaust gas duct 74 just downstream from the separator 68. The bypass duct 112 is shown provided with a butterfly valve 114. Accordingly, when the flow of exhaust gas through the left branch of the duct 36 exceeds the flash evaporator requirements for hot gas, the excess can be bypassed directly to evaporator duties through the duct 112 by opening the valve 114 the requisite amount. This can be accomplished manually or automatically via conventional flow responsive valve regulator (not shown).

As an important feature of the present invention, the press liquor surge tank is provided with means for determining whether the inflow of press liquor to the evaporating system is increasing, decreasing, or remaining constant. In order to make maximum usage of the equipment and prevent falling behind on the processing of press liquor over the long term, it is necessary to feed press liquor from the surge tank into the evaporator system of an increased rate when the inflow rate responsive means indicates that the batch of cannery waste is contributing more press liquors by weight percent than the last. In the present instance, such indication is shown being provided by a float control valve 116 arranged to deliver press liquor from the surge tank to the flash evaporator at a rate proportional to the rate of press liquor inflow to the surge tank from the cannery waste press (not shown). The float valve 116 is also connected to the fuel burner 48 of the flash evaporator furnace 44 to increase the amount of fuel burned and decrease the amount of fuel burned in proportion to the increase and decrease of press liquor input to the flash evaporator. Since as seen in Example I certain cannery wastes produce sufficient press cake compared to press liquor that the energy in the solids dryer exhaust gas is sufficient to concentrate the press liquor to the desired thickness, for instance 72 Brix without additional thermal energy input, the float valve 116 operates to reduce fuel combustion in the flash evaporator furnace burner to zero, i.e. to turn the burner off, when thermal energy input is not required thus providing efficient means for coping with varying evaporator load as a precentage of dryer load in a heat recovering, integrated system.

The system 120 shown in FIGURE 2 is identical in all respects to that shown in FIGURE 1 and is similarly numbered, but for the evaporators downstream from the separator 68. In FIGURE 2, the two vacuum pans in series have been replaced by two jacketed tube-type heat exchangers 122, 124 in parallel through which the liquor is pumped upwardly to the outlet conduit 126, being heated by the flow of hot exhaust gases around the tubes. In this embodiment, evaporation of the low boiling fractions, mainly water takes place in a baffle chamber 128 into whose shell the conduit 126 empties. The hot liquor falls in a film inside wall 130 and over baffles 132 of the chamber 128, zig-zagging to the bottom and passing out through the outlet 134. In instances where one pass of the liquor is not sufficient to provide desired concentration a splitter valve 136 and pump 138 can be employed to recycle liquor to the heat exchangers 122, 124.

An exhaust fan 140 provides a countercurrent flow of air through the liquor stream in the chamber 128, carrying evaporated constituents out the stack 142. The height of the chamber 128 and air mass flow are such that the air is saturated upon reaching the stack.

The novel flash evaporator input responsive control arrangement of FIGURE 2 works in the same manner as that of FIGURE 1.

From the foregoing description, it should now be apparent that the present invention accomplishes each of the objects set forth at the outset of the specification and that the embodiments described illustrate the principles of the invention clearly.

These embodiments can be considerably modified without departing from the invention's principles or failing to accomplish its objects. For instance, novel interposition of the liquor input rate, controlled burning of fuel in the furnace of a flash evaporator in a dryer-evaporator system for drying and concentration of press cake syrup forming press liquor, would work to advantage even if all dryer hot exhaust gases were forwarded to the press liquor evaporation system without recycling, though the system as described is much preferred because of its efficiency. Recognizing such room for modification, the present invention should be understood as encompassing all such modifications as are within the spirit and scope of the following claims.

I claim:

1. Apparatus for dehydrating pulpy solids and syrup-forming liquid to a preselected moisture content by weight comprising:

a dryer; means for inducting a stream of gas into the dryer; means for heating said gas; means for inducting wet pulpy solids into the dryer for transport therethrough in the heated gas stream to thereby evaporate moisture from the wet pulpy solids into the heated gas stream; means for separating the dried pulpy solids from the heated gas stream; a flash evaporator; conduit means for directing at least part of the heated gas stream from the separating means to the flash evaporator; means for further heating the heated gas stream entering the flash evpaorator whereby moisture is flash evaporated from the syrup forming liquid into the heated gas stream; conduit means for receiving a supply of syrup-forming liquid and for directing the received syrup-forming liquid to said flash evaporator for direct contact in the flash evaporator with the heated gas stream; means for separating the partly dehydrated syrup-forming liquid from the heated gas stream; evaporator means, means for forwarding the partly dehydrated syrup-forming liquid and heated gas stream to the evaporator means for further evaporation of moisture from the partly dehydrated syrup-forming liquid as heat is given up by the heated gas stream; means for venting the gas stream from the evaporator means and means for withdrawing the syrup from the evaporator means.

2. The apparatus of claim 1 wherein the conduit means for receiving a supply of syrup-forming liquid includes hold-up tank means; means sensing the rate of inflow of syrup-forming liquid to said hold-up tank means and increasing outflow of syrup-forming liquid through the conduit means to the flash evaporator and increasing the amount of heat added to the heated gas by said further heating means in response to sensation of increased rate of syprup-forming liquid inflow to the tank-means, and decreasing outflow of syrup-forming liquid to the flash evaporator and decreasing the amount of heat added to said heated gas by said further heating means in response to sensing a decreased rate of syrup-forming liquid inflow to said hold-up tank means.

3. Apparatus for dehydrating pulpy solids and syrup-forming liquid to a preselected moisture content by weight comprising:

a dryer; means for inducting a stream of gas into the dryer; means for heating said gas; means for inducting wet pulpy solids into the dryer for transport therethrough in the heated gas stream to thereby evaporate moisture from the wet pulpy solids into the heated gas stream; means for separating the dried pulpy solids from the heated gas stream; a flash evaporator; conduit means for directing at least part of the heated gas stream from the separting means to the flash evaporator; means for further heating the heated gas stream entering the flash evaporator whereby moisture is flash evaporated from the syrup-forming liquid into the heated gas stream; conduit means for receiving a supply of syrup-forming liquid and for directing the received syrup-forming liquid to said flash evaporator for direct contact in the flash evaporator with the heated gas stream;

means for separating the partly dehydrated syrup-forming liquid from the heated gas stream; evaporator means; means forwarding the partly dehydrated syrup-forming liquid and heated gas stream to the evaporator means for further evaporation of moisture from the partly dehydrated syrup-forming liquid as heat is given up by the heated gas stream; means for venting the gas stream from the evaporator means and means for withdrawing the syrup from the evaporator means;

conduit and valve means for recycling to the dryer a portion of the effluent heated gas stream from the dryer downstream from the first-mentioned separating means to thereby maintain a sufficiently high velocity in the dryer to effect transport of the drying pulpy solids therethrough; conduit and valve means for directing part of the heated gas stream from the first-mentioned separating means to the evaporator means by by-passing said flash evaporator.

4. The apparatus of claim 3 wherein said heating means and said further heating means each comprise a fuel burner and direct heat hot air furnace.

5. The apparatus of claim 3 wherein the evaporator means comprises at least one vacuum pan having tubes enclosed in a jacket; conduit means for drawing a vacuum on said tubes as the partly dehydrated syrup-forming liquid is coursed therethrough, whereby moisture is evaporated from the syrup-forming liquid as the heated gas stream is directed through the jacket and around the outside of the tubes.

6. The apparatus of claim 3 wherein the evaporator means comprises at least one atmospheric pressure-type heat exchanger having tubes enclosed in a jacket whereby upon conducting the partly dehydrated syrup-forming liquid through said tubes and the heated gas stream within the jacket and around the outside of the tubes heat is lost by the gas and picked up by the liquid; the evaporator means further comprising a falling film evaporator downstream from the means for venting the gas stream, said falling film evaporator having inlet means at the top thereof for receiving heated partly dehydrated syrup-forming liquid from said atmospheric pressure type heat exchanger to make up a falling film of the liquid; means for inducting an upflow of moisture absorbing fluid into the falling film evaporator for contact with the falling film and means for venting said fluid to the atmosphere after its contact with the falling film to thereby dehydrate the liquid to a syrup.

7. A process for dehydrating wet pulpy solids and syrup-forming liquid to a preselected moisture content by weight comprising:

(a) heating a stream of combustion-supporting gas by burning fuel in said gas;
(b) inducting the heated gas stream into a dryer;
(c) inducting wet pulpy solids into the dryer and carrying said wet pulpy solids along through the dryer in the heated gas stream, evaporating moisture therefrom into the heated gas stream;
(d) separating the dried pulpy solids from the heated gas stream; then
(e) directing at least part of the heated gas stream issuing from the dryer to a flash evaporator;
(f) directing a variable quantity per time supply of syrup-forming liquid to a surge tank;
(g) sensing change of level of syrup-forming liquid in said surge tank;
(h) directing syrup-forming liquid from the surge tank into the flash evaporator at a faster rate when said level exceeds a predetermined level and at a slower rate when said level is lower than said predetermined level;
(i) further heating said heated gas stream prior to its contact with said syrup-forming liquid by an amount directly proportional to said rate when if further heat were not added to said heated gas stream the syrup-forming liquid would not be dehydrated to said preselected moisture content by weight;
(j) burning more fuel in said gas immediately prior to the flash evaporator in response to an increase in the rate of influx of syrup-forming liquid and burning less fuel in said gas immediately prior to the flash evaporator in response to a decrease in the rate of influx of syrup-forming liquid;
(k) flash evaporating moisture from the syrup-forming liquid into the heated gas stream;
(l) separating the partly dehydrated syrup-forming liquid from the heated gas stream and forwarding each to an evaporator;
(m) effecting further evaporation and separation of moisture from the syrup-forming liquid in said evaporator thereby making syrup from the syrup-forming liquid and cooling said heated gas stream by heat exchange in said evaporator, in said evaporator the partly dehydrated syrup-forming liquid being directed through tubes, vacuum being drawn on said tubes and said heated gas stream being passed around the outside of said tubes;
(n) the syrup being directed through the tubes of a secondary vacuum pan, vacuum being drawn on said tubes and hot vapor from a primary tube bundle being passed around the outside of said tubes effecting further evaporation of moisture from said syrup; and
(o) venting the cooled gas stream and withdrawing the syrup.

8. The process of claim 7 further including recycling to the dryer a major portion of the effluent heated gas stream from the dryer, after the dried pulpy solids have been separated therefrom in order to maintain a sufficiently high velocity in the dryer to effect transport of the drying pulpy solids therethrough.

9. The process of claim 8 wherein the amount of combustion-supporting gas inducted into the dryer on each pass is substantially equal to the amount sufficient to support complete combustion of all of the fuel being burned in process at the time.

10. A process for drying wet pulpy solids and a syrup-forming liquor comprising:
heating a stream of air and combustion gases in a direct heat furnace;
passing the heated gas stream through a direct heat dryer;
directing a supply of wet pulpy solids into the direct heat dryer;
intimately contacting the heated gas stream and wet pulpy solid supply in the direct heat dryer, thereby evaporating moisture from the wet pulpy solids into the heated gas stream;
returning part of the heated gas stream, after contact with the wet pulpy solids, to the furnace combination with the gas stream being heated therein and for adding additional heat energy thereto, the return and combination thus increasing the dew point temperature of the heated gas stream; forwarding the remainder of the heated gas stream, after contact with the wet pulpy solids, to another direct heat furnace and adding additional heat energy to this gas stream therein;
introducing a spray of syrup-forming liquor into intimate contact with the additionally last-mentioned gas stream, thereby evaporating moisture from the liquor into the gas stream as water vapor, further increasing the dew point temperature of this gas stream;
passing the last-mentioned gas stream over one side of an indirect heat transfer unit while passing the syrup-forming liquor over the opposite side of the unit, thereby evaporating moisture from the liquor by condensing moisture from the last-mentioned gas stream;
withdrawing the concentrated liquor from the heat exchange unit; and
exhausting the gas stream to the atmosphere.

References Cited

UNITED STATES PATENTS

| | | | |
|---|---|---|---|
| 1,200,996 | 10/1916 | Soderlund et al. | 159—44 X |
| 2,056,266 | 10/1936 | Goodell | 159—4 X |
| 2,216,815 | 10/1940 | Hall | 159—4 |
| 2,217,547 | 10/1940 | Hall | 159—4 |
| 2,303,318 | 12/1942 | Baskervill | 23—165 |
| 2,377,282 | 5/1945 | Tomlinson | 23—262 |
| 2,385,955 | 10/1945 | Tomlinson | 23—131 |
| 2,839,122 | 6/1958 | Laguiharre | 159—4 |
| 3,118,775 | 1/1964 | Byer et al. | 99—205 |
| 3,153,609 | 10/1964 | Markant et al. | 126—36 |
| 3,176,755 | 4/1965 | Harman | 159—44 |

FOREIGN PATENTS 587,121   4/1947   Great Britain.

OTHER REFERENCES

Catalogue, "Recirculated Gas and its Relation to Boiler Design and Operation," Babcock and Wilcox Co., Boiler Division, Barberton, Ohio, Bulletin G–96, July 1959, pages 2 and 3.

NORMAN YUDKOFF, *Primary Examiner.*

J. SOFER, *Assistant Examiner.*